(12) United States Patent
Cho et al.

(10) Patent No.: US 9,510,021 B2
(45) Date of Patent: Nov. 29, 2016

(54) METHOD AND APPARATUS FOR FILTERING PIXEL BLOCKS

(71) Applicant: ELECTRONICS AND TELECOMMUNICATIONS RESEARCH INSTITUTE, Daejeon (KR)

(72) Inventors: Seunghyun Cho, Daejeon (KR); Hyun Mi Kim, Daejeon (KR); Kyung Jin Byun, Daejeon (KR); Nak Woong Eum, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 238 days.

(21) Appl. No.: 14/286,822

(22) Filed: May 23, 2014

(65) Prior Publication Data
US 2014/0348250 A1 Nov. 27, 2014

(30) Foreign Application Priority Data

May 24, 2013 (KR) .......................... 10-2013-0059310
Apr. 23, 2014 (KR) .......................... 10-2014-0048909

(51) Int. Cl.
*H04N 19/86* (2014.01)
*H04N 19/423* (2014.01)

(52) U.S. Cl.
CPC ............ *H04N 19/86* (2014.11); *H04N 19/423* (2014.11)

(58) Field of Classification Search
CPC ............................ H04N 19/423; H04N 19/86
USPC .................................................... 375/240.29
See application file for complete search history.

(56) References Cited

U.S. PATENT DOCUMENTS

| | | | |
|---|---|---|---|
| 2004/0017515 A1* | 1/2004 | Lange ................ | H04N 19/176 348/607 |
| 2007/0071095 A1* | 3/2007 | Lim .................... | H04N 19/86 375/240.08 |
| 2007/0086528 A1* | 4/2007 | Mauchly ............ | H04N 19/174 375/240.24 |
| 2008/0159407 A1 | 7/2008 | Yang et al. | |
| 2012/0087414 A1 | 4/2012 | Shin | |
| 2013/0163680 A1* | 6/2013 | Oertel ................ | H04N 19/0089 375/240.29 |
| 2013/0170562 A1* | 7/2013 | Van der Auwera ............ | H04N 19/0089 375/240.25 |
| 2013/0182765 A1* | 7/2013 | Gao .................. | H04N 19/00569 375/240.12 |
| 2013/0215976 A1* | 8/2013 | Kim .................... | H04N 19/176 375/240.25 |
| 2013/0243104 A1* | 9/2013 | Chen .................. | H04N 19/51 375/240.29 |

FOREIGN PATENT DOCUMENTS

| | | |
|---|---|---|
| KR | 10-2009-0094340 A | 9/2009 |
| KR | 10-2010-0130839 A | 12/2010 |
| KR | 10-2012-0125193 A | 11/2012 |

* cited by examiner

*Primary Examiner* — Francis G Geroleo

(57) ABSTRACT

Provided is a method for a plurality of processing elements to filter a plurality of pixel blocks in a plurality of picture partitions for a single frame image. The method for filtering pixel blocks includes: checking the status of a second boundary pixel block adjacent to a picture partition boundary, the second boundary pixel block being one of a plurality of pixel blocks in a second picture partition and neighboring a first boundary pixel block in a first picture partition, the first boundary pixel block neighboring the picture partition boundary; selecting a filtering area for the first boundary pixel block based on the status of the second boundary pixel block; and filtering the filtering area for the first boundary pixel block.

20 Claims, 11 Drawing Sheets

METHOD AND APPARATUS FOR FILTERING PIXEL BLOCKS

CROSS-REFERENCE TO RELATED APPLICATION

This application claims priority to and the benefit of Korean Patent Application No. 10-2013-0059310 and 10-2014-0048909 filed in the Korean Intellectual Property Office on May 24, 2013 and Apr. 23, 2014, the entire contents of which are incorporated herein by reference.

BACKGROUND OF THE INVENTION (a) Field of the Invention

The present invention relates to a method and apparatus for filtering pixel blocks, and more particularly, to a method and apparatus for filtering pixel blocks which can efficiently process pixel blocks adjacent to partition boundaries in parallel when segmenting an image frame and processing it in parallel.

(b) Description of the Related Art

HEVC (High Efficiency Video Coding) is a video standard that is currently being established by the JCT-VC (Joint Collaborative Team on Video Coding) jointly organized by ITU-T SG 16 WP 3 and ISO/IEC JTC 1/SC 29/WG 11. HEVC uses picture partitioning schemes for the purpose of video parallel processing or for the purpose of improving robustness to errors occurring during transmission.

The picture partitioning schemes for HEVC largely include slices, tiles, and WPP (wavefront parallel processing). These picture partitioning schemes are also expected to be widely used in other video standards as well as HEVC. Even if the video standard does not explicitly support picture partitioning, methods of partitioning a picture for parallel processing are used depending on the method of video codec implementation.

Meanwhile, in order to reduce image quality degradation due to blocking artifacts produced when grouping pixels included in an image into blocks and processing the blocks, most video standards use their own filtering method for restored signals. A typical example of this filtering method may include deblocking filtering, which is an in-loop filtering method employed by H.264/AVC, HEV, etc. Deblocking filtering of a pixel block involves data dependency on pixels in neighboring blocks. In some cases, other filtering methods than deblocking filtering may be additionally used to reduce image quality degradation among pixel blocks or within pixel blocks. They also involve data dependency among neighboring pixel blocks.

Even when splitting a picture into a number of picture partitions by the aforementioned picture partitioning method and allocating the picture partitions to processing elements for independent processing, pixel blocks adjacent to picture partition boundaries need to be filtered. When the pixel blocks adjacent to picture partition boundaries is filtered by an additional processing elements, cost for the additional processing elements is occurred.

Alternatively, a processing element allocated to a picture partition may be put into standby until pixel blocks in neighboring picture partitions are processed for filtering picture partition boundaries, which results in degradation in video processing speed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for filtering pixel blocks, which prevent degradations in processing speed without additional processing elements for in-loop filtering of pixel blocks adjacent to picture partition boundaries when allocating different picture partitions to different processing elements to process them independently.

An exemplary embodiment of the present invention provides a method for a plurality of processing elements to filter a plurality of pixel blocks in a plurality of picture partitions for a single frame image. The method for filtering pixel blocks may include: checking the status of a second boundary pixel block adjacent to a picture partition boundary, the second boundary pixel block being one of a plurality of pixel blocks in a second picture partition and neighboring a first boundary pixel block in a first picture partition, the first boundary pixel block neighboring the picture partition boundary; selecting a filtering area for the first boundary pixel block based on the status of the second boundary pixel block; and filtering the filtering area for the first boundary pixel block.

The method for filtering pixel blocks may further include updating the status of the first boundary pixel block to "filtered" once filtering of the filtering area is completed.

The selecting may include, if the status of the second boundary pixel block indicates "unfiltered", selecting an inner portion of the first boundary pixel block but not a filter-sharing block between the first and second boundary pixel blocks as the filtering area, the filter-sharing block including some pixels of the first and second boundary pixel blocks adjacent to the picture partition boundary.

The filtering may include: performing in-loop filtering or post-loop filtering on the inner portion of the first boundary pixel block; and storing pixel data in an area other than the filtering area for the first boundary pixel block in a buffer.

If the inner portion of the first boundary pixel block is selected as the filtering area, the inner portion of the second boundary pixel block and the filter-sharing block may be selected as a filtering area for the second boundary pixel block, and the pixel data in the area other than the filtering area may be used to filter the filtering area for the second boundary pixel block.

The selecting may include, if the status of the second boundary pixel block indicates "filtered", selecting the entire first boundary pixel block and a filter-sharing block between the first and second boundary pixel blocks as the filtering area for the first boundary pixel block, the filter-sharing block including some pixels of the first and second boundary pixel blocks adjacent to the picture partition boundary.

If the entire first boundary pixel block and the filter-sharing block are selected as the filtering area for the first boundary pixel block, the inner portion of the second boundary pixel block but not the filter-sharing block may be selected as a filtering area for the second boundary pixel block.

The checking may include updating the status of the first boundary pixel block to "checking", which indicates that the second boundary pixel block is being checked.

The checking may include checking the status of the second boundary pixel block with reference to the buffer storing the status indices of all of the boundary pixel blocks, the status index including a bit string.

Another exemplary embodiment of the present invention provides an apparatus for a plurality of processing elements to filter a plurality of pixel blocks in a plurality of picture partitions for a single frame image. The apparatus for filtering pixel blocks may include: a boundary pixel block status checker; and a filter. The boundary pixel block status checker may check the status of a second boundary pixel block adjacent to a picture partition boundary, the second boundary pixel block being one of a plurality of pixel blocks in a second picture partition and neighboring a first boundary pixel block in a first picture partition, the first boundary pixel block neighboring the picture partition boundary, and select a filtering area for the first boundary pixel block based on the status of the second boundary pixel block. The filter may filter the selected filtering area for the first boundary pixel block.

The apparatus for filtering pixel blocks may further include a boundary pixel block status update unit. The boundary pixel bock status update unit may update the status of the first boundary pixel block to "filtered" once filtering on the filtering area is completed.

The boundary pixel block status checker may select the entire portion of a non-boundary pixel block as a filtering area for the non-boundary pixel block, the non-boundary pixel block being one of the plurality of pixel blocks in the first picture partition and not adjacent to the picture partition boundary.

If the status of the second boundary pixel block indicates "unfiltered", the boundary pixel block status checker may select the inner portion of the first boundary pixel block but not a filter-sharing block between the first and second boundary pixel blocks as the filtering area, the filter-sharing block including some pixels of the first and second boundary pixel blocks adjacent to the picture partition boundary.

The filter may store pixel data in the area other than the filtering area for the first boundary pixel block in a buffer, and if the inner portion of the first boundary pixel block is selected as the filtering area, the inner portion of the second boundary pixel block and the filter-sharing block may be selected as a filtering area for the second boundary pixel block, and the pixel data in the area other than the filtering area may be used to filter the filtering area for the second boundary pixel block.

If the status of the second boundary pixel block indicates "filtered", the boundary pixel block status checker may select the entire first boundary pixel block and a filter-sharing block between the first and second boundary pixel blocks as the filtering area for the first boundary pixel block.

The boundary pixel block status checker may update the status of the first boundary pixel block to "processing" after the filtering area is selected.

If the status of the second boundary pixel block indicates "processing", the boundary pixel block status checker may wait until filtering on the second boundary pixel block is completed.

DETAILED DESCRIPTION OF THE EMBODIMENTS

Figure 1:
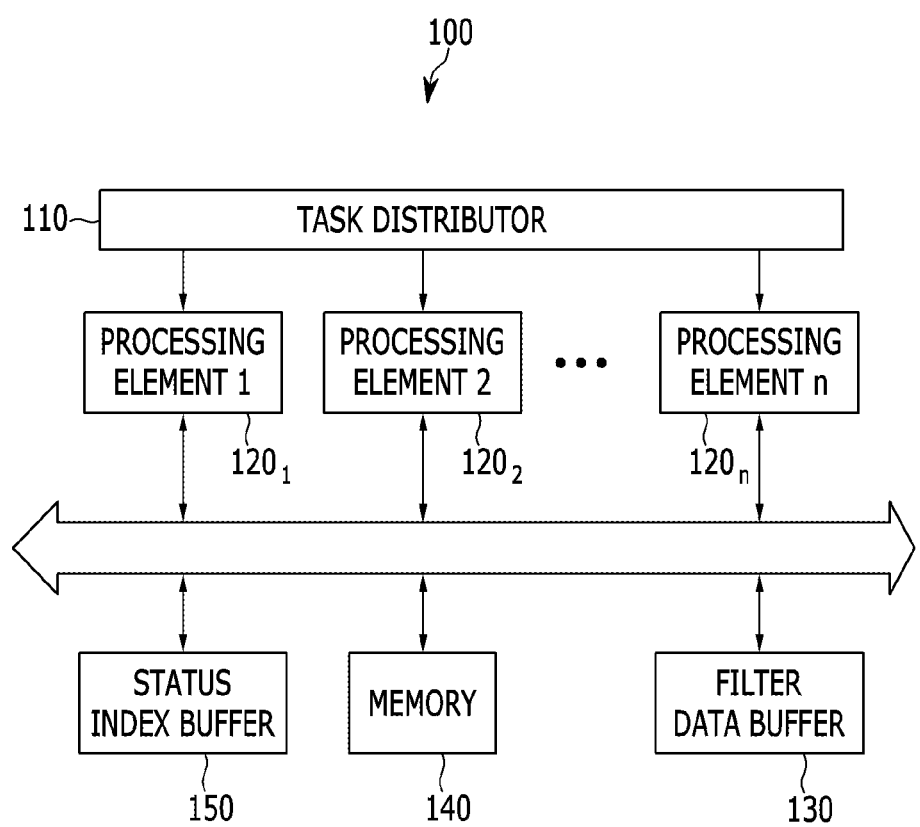
FIG. 1 is a view showing an example of a computer system where an image encoding device or an image decoding device is implemented according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising" will be understood to imply the inclusion of stated elements but not the exclusion of any other elements.

Now, a method and apparatus for filtering pixel blocks according to an exemplary embodiment of the present invention will be described in detail with reference to the drawings.

Figure 2:
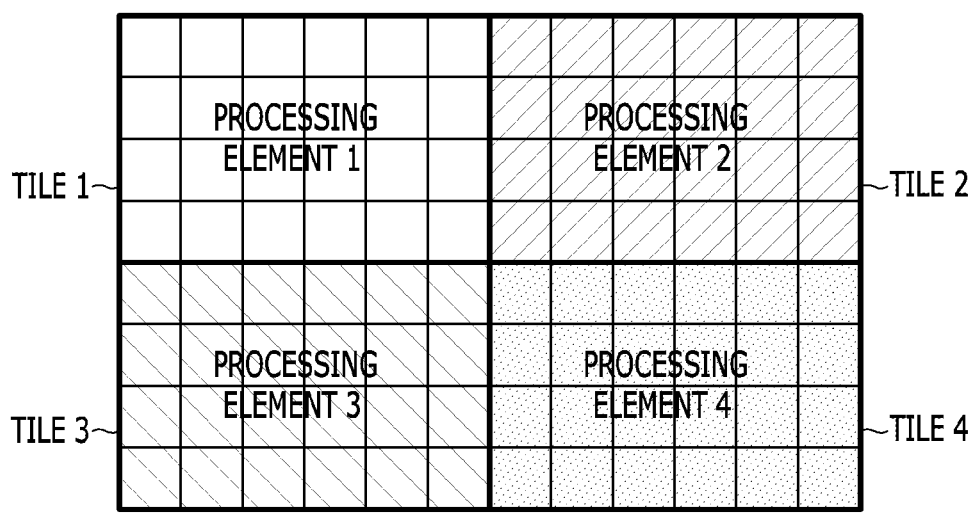
FIGS. 2 and 3 are views showing an example of a method of processing an image frame in parallel according to an exemplary embodiment of the present invention.
Figure 3:
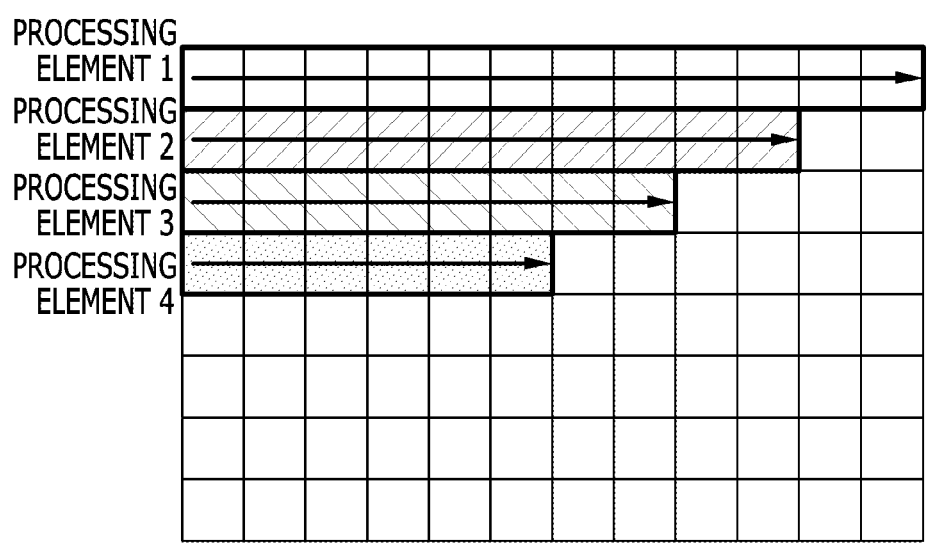

FIG. 1 is a view showing an example of a computer system where an image encoding device or an image decoding device is implemented according to an exemplary embodiment of the present invention. FIGS. 2 and 3 are views showing an example of a method of processing an image frame in parallel according to an exemplary embodiment of the present invention.

Referring to FIG. 1, a computer system 100 includes a task distributor 110, processing elements 1 to N $120_1$ to $120_N$, a filter data buffer 130, a memory 140, and a status index buffer 150.

The task distributor 100 allocates pixel blocks to the processing elements 1 to N $120_1$ to $120_N$ to process them. An image frame to be processed by the image encoding device or the image decoding device may be divided into a plurality of picture partitions. A pixel block may be an entire picture partition or a part of a picture partition.

For example, an image frame may be divided into four tiles (picture partitions) as illustrated in FIG. 2. The task distributor 100 may allocate one tile to one processing element. That is, when there are four processing elements 1 to 4, the processing element 1 can process a tile 1, the processing element can process a tile 2, the processing element 3 can process a tile 3, and the processing element can process a tile 4. Alternatively, a plurality of processing elements may be allocated to one picture partition. As illustrated in FIG. 3, each row of one picture partition may be allocated to each processing element.

Referring back to FIG. 1, the processing elements 1 to N $120_1$ to $120_N$ encode an image of allocated pixel blocks or decode the encoded image. The processing elements 1 to N $120_1$ to $120_N$ may be implemented as central processing units (CPUs), other dedicated chipsets, or microprocessors, and may include threads that are partitioned and executed within a single CPU. The processing elements 1 to N $120_1$ to $120_N$ may correspond to a plurality of cores within a single CPU. The processing elements 1 to N $120_1$ to $120_N$ may have the same structure or different structures. The processing elements 1 to N $120_1$ to $120_N$ may encode and decode an image of pixel blocks by executing program instructions for implementing the functions of an image encoding method and device or an image decoding method and device.

In order to allocate different pixel blocks to different processing elements 1 to N $120_1$ to $120_N$ and process them independently, the filter data buffer 130 stores unfiltered pixels or pixels that have been filtered, but it is still required to filter neighboring pixel blocks, among the pixels within a pixel block, and filter-related parameters. The filter data buffer 130 may exist within the memory 140 or equivalent storage devices. The number of pixels to be stored and the types of filter-related parameters vary depending on video codecs. The filter-related parameters may include conditions for filtering, types of filters to be used, and so on.

The memory 140 may be implemented as media such as dynamic random access memory (DRAM), Rambus DRAM (RDRAM), synchronous DRAM (SDRAM), and static RAM (SRAM). The memory 140 may store program instructions for implementing the functions of image encoding/decoding methods and devices. The program instructions may be stored in other systems connected over a network. The memory 140 also may store an image decoded by the processing elements 1 to N $120_1$ to $120_N$. The image stored in the memory 140 may be used as a reference image later for encoding or decoding other pixel blocks.

The status index buffer 150 stores the status indices of pixel blocks adjacent to picture partition boundaries, i.e., boundary pixel blocks. The status indices of the boundary pixel blocks are updated during image encoding and decoding processes.

Figure 4:
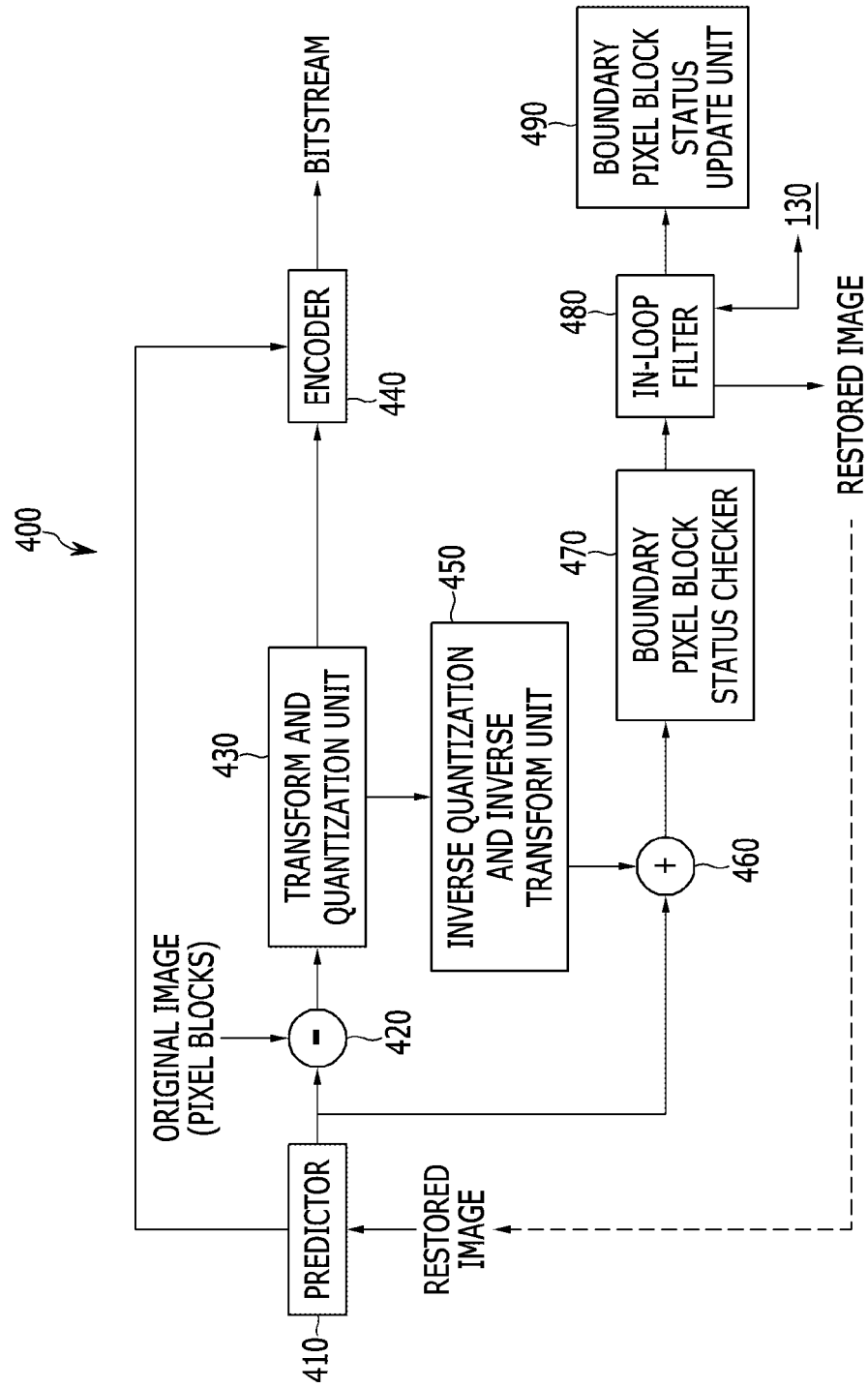
FIG. 4 is a view showing an example of an image encoding device according to an exemplary embodiment of the present invention.

FIG. 4 is a view showing an example of an image encoding device according to an exemplary embodiment of the present invention.

Referring to FIG. 4, an image encoding device 400 includes a predictor 410, a subtractor 420, a transform and quantization unit 430, an encoder 440, an inverse quantization and inverse transform unit 450, an adder 460, a boundary pixel block status checker 470, an in-loop filter 480, and a boundary pixel block status update unit 490. The boundary pixel block status checker 470, in-loop filter 480, and boundary pixel block status update unit 490 of the image encoding device 400 may constitute a pixel block filtering apparatus.

Program instructions for implementing the functions of the predictor 410, subtractor 420, transform and quantization unit 430, encoder 440, inverse quantization and inverse transform unit 450, adder 460, boundary pixel block status checker 470, in-loop filter 480, and boundary pixel block status update unit 490 may be loaded to the memory 140.

The predictor 410 predicts the current pixel block to compress with reference to a reference block, and outputs a prediction block to the subtractor 420.

The subtractor 420 subtracts the prediction block from the current pixel block to generate a residual block. The subtractor 420 calculates the difference between the original pixel value of each pixel of the current pixel block and the predicted pixel value of each pixel of the prediction block, and generates a residual block having residual data.

The transform and quantization unit 430 transforms the residual block into frequency domain coefficients. The transform and quantization unit 430 transforms the residual data of the residual block into frequency coefficients by frequency conversion. To transform a residual block into a frequency domain, the transform and quantization unit 430 may use a variety of transform techniques, such as Hadamard Transform and Discrete Cosine Transform Based Transform, in order to transform an image signal of a time axis into an image signal of a frequency axis.

The transform and quantization unit 430 quantizes the frequency coefficients of the residual block. The transform and quantization unit 430 may quantize the frequency coefficients of the residual block and generate quantized frequency coefficients. The transform and quantization unit 430 may use DZUTQ (Dead Zone Uniform Threshold Quantization), a Quantization Weighted Matrix, or an improved quantization method thereof in order to quantize the frequency coefficients of the residual block.

The encoder 440 encodes the quantized frequency coefficients of the quantized residual block and creates a bitstream. As an encoding method, an entropy encoding technique or various other encoding techniques may be used.

The inverse quantization and inverse transform unit 450 inversely quantizes the quantized frequency coefficients of the quantized residual block. The inverse quantization and inverse transform unit 450 may inversely quantize the quantized frequency coefficients of the quantized residual block and generate frequency coefficients.

The inverse quantization and inverse transform unit 450 inversely transforms the frequency coefficients of the inversely quantized residual block. The inverse quantization and inverse transform unit 450 inversely transforms the frequency coefficients of the inversely quantized residual block and creates a residual block of a time domain.

The adder 460 adds a prediction block predicted by the predictor 410 to the inversely transformed residual block to restore the current pixel block.

The boundary pixel block status checker 470 checks whether the current pixel block restored by the adder 460 is adjacent to a picture partition boundary or not. Pixel blocks may be divided into boundary pixel blocks and non-boundary pixel blocks depending on whether they are adjacent to picture partition boundaries or not. The pixel blocks adjacent to picture partition boundaries are referred to as boundary pixel blocks, and the pixel blocks not neighboring the picture partition boundaries are referred to as non-boundary pixel blocks.

If the current pixel block is a boundary pixel block, the following procedure may be carried out. The boundary pixel block status checker 470 checks the status indices of boundary pixel blocks adjacent to the current boundary pixel block restored by the adder 460 and positioned in picture partitions other than the one the current boundary pixel block belongs to. The boundary pixel block status checker 470 may check the statuses of the boundary pixel blocks adjacent to the current boundary pixel block, based on the status indices of boundary pixel blocks shared among different processing elements. The statuses of boundary pixel blocks are checked in order to determine whether to perform in-loop filtering, on the pixels having data dependency on neighboring boundary pixel blocks among on the pixels positioned left, right, above, or below a boundary pixel block, together with the corresponding boundary pixel block or not.

The boundary pixel block status checker 470 selects an in-loop filtering area processed by the in-loop filter 480 for the current boundary pixel block, based on the status indices of the boundary pixel blocks adjacent to the current boundary pixel block. The boundary pixel block status checker 470 may select the in-loop filtering area processed by the in-loop filter 480 by determining whether to perform in-loop filtering, on a filter-sharing block between boundary pixel blocks adjacent to the current boundary pixel block and the current boundary pixel block, together with the current boundary pixel block or not.

Figure 5:
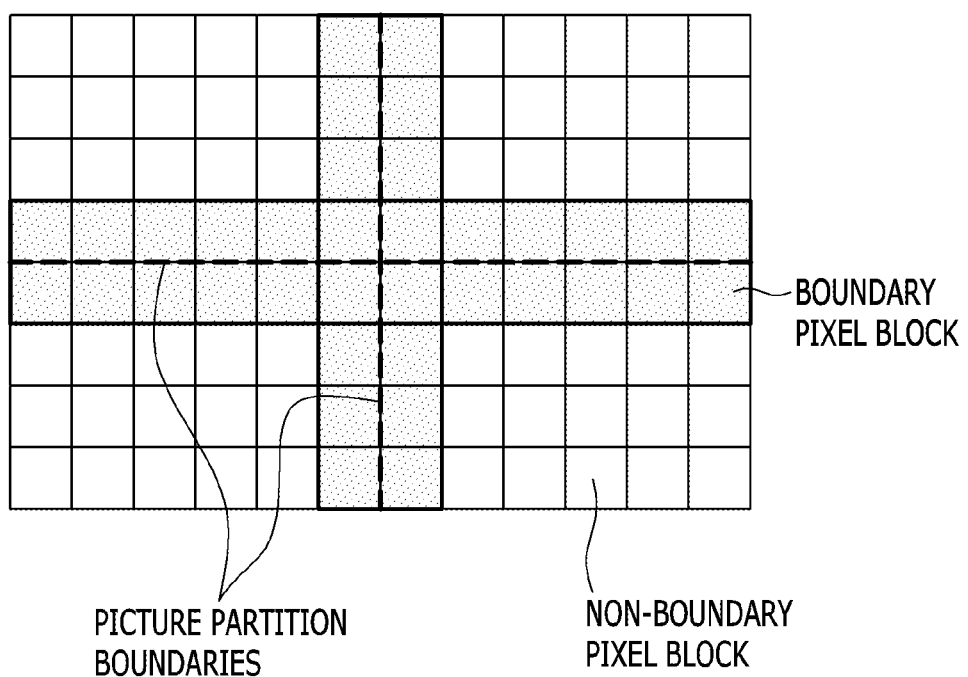
FIG. 5 is a view showing an example of boundary pixel blocks according to an exemplary embodiment of the present invention.

FIG. 5 is a view showing an example of boundary pixel blocks according to an exemplary embodiment of the present invention.

Referring to FIG. 5, when a single image frame is divided into a plurality of picture partitions, a boundary pixel block may be defined as a set of pixels positioned within a given distance in up, down, left, and right directions from the boundary line between the picture partitions.

Each picture partition may be sub-divided into a plurality of pixel blocks. Each pixel block is assigned a status index, and the status index is a bit string that indicates the status of a boundary pixel block to determine the in-loop filtering area of the in-loop filter 480. For example, the status index of a boundary pixel block may be represented by 2 bits, and shows the status of the boundary pixel block as in Table 1.

TABLE 1

| Status index value of boundary pixel block (2 bits) | Status of boundary pixel block |
| --- | --- |
| 00 | Unfiltered (Unfiltered, U) |
| 01 | Checking status index of neighboring boundary pixel block (Check, C) |
| 10 | Processing (Processing, P) |
| 11 | Filtered (Filtered, F) |

In Table 1, the status index value "00" of a boundary pixel block indicates that the boundary pixel block is unfiltered, and "unfiltered" indicates that the in-loop filtering of the boundary pixel block has not begun. The status index value "01" of a boundary pixel block represents "checking the status index of a neighboring boundary pixel block," and thereby indicates that the status of a neighboring boundary pixel block is being checked. The status index value "10" of a boundary pixel block indicates that the boundary pixel block is being processed, and "processing" indicates that the in-loop filtering is being performed on a boundary pixel block. Lastly, the status index value "11" of a boundary pixel block indicates that the boundary pixel block has been filtered, and "filtered" indicates that in-loop filtering has been performed on the boundary pixel block.

By allocating more bits to the status index of a boundary pixel block, the status of the boundary pixel block can be more specific.

Referring back to FIG. 4, the in-loop filter 480 performs in-loop filtering on the in-loop filtering area selected by the boundary pixel block status checker 470. The in-loop filter 480 may include at least one filter. The in-loop filter 480 may include a deblocking filter and at least one additional filter, for example. The in-loop filter 480 may store an in-loop filtered block in a memory (e.g., 140 of FIG. 1), or store data required to perform in-loop filtering on neighboring boundary pixel blocks in a filter data buffer (e.g., 130 of FIG. 1). In-loop filtering refers to reducing block distortions that occur during encoding of an image in pixel blocks, and an in-loop filter may be applied to pixel blocks at picture partition boundaries.

The current block in-loop filtered by the in-loop filter 480 may be input into the predictor 410 and used as a reference image to predict the next pixel block.

If the current pixel block that has been in-loop filtered is a boundary pixel block, the boundary pixel block status update unit 490 updates the status of the boundary pixel block. The boundary pixel block status update unit 490 updates the status index of an in-loop filtered boundary pixel block from "10" to "11".

Figure 6:
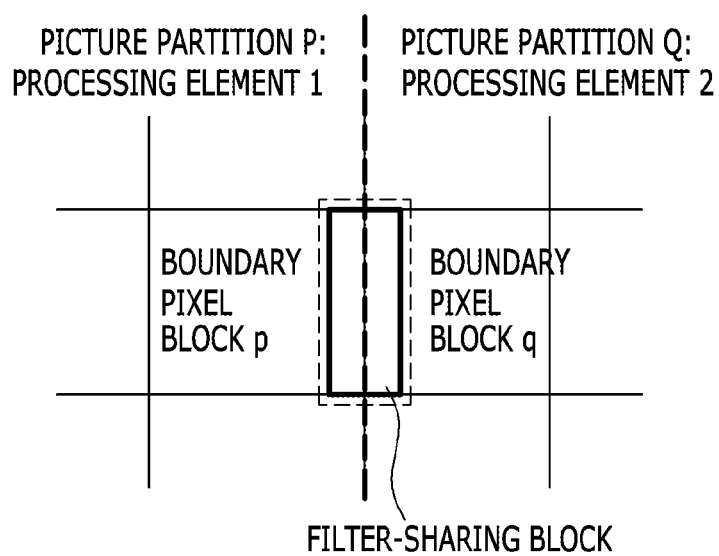
FIG. 6 is a view showing an example of a filter-sharing block within two neighboring pixel blocks processed by different processing elements.
Figure 7:
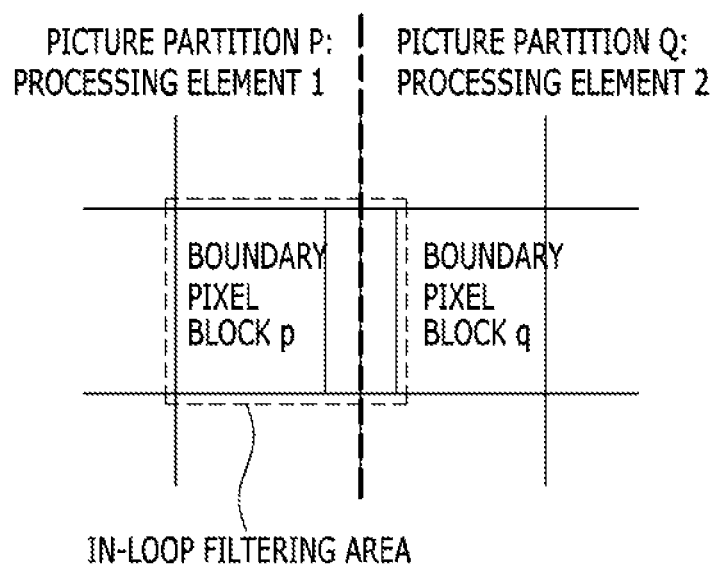
FIGS. 7 and 8 are views showing an example of an in-loop filtering area selected by the boundary pixel block status checker of FIG. 4.
Figure 8:
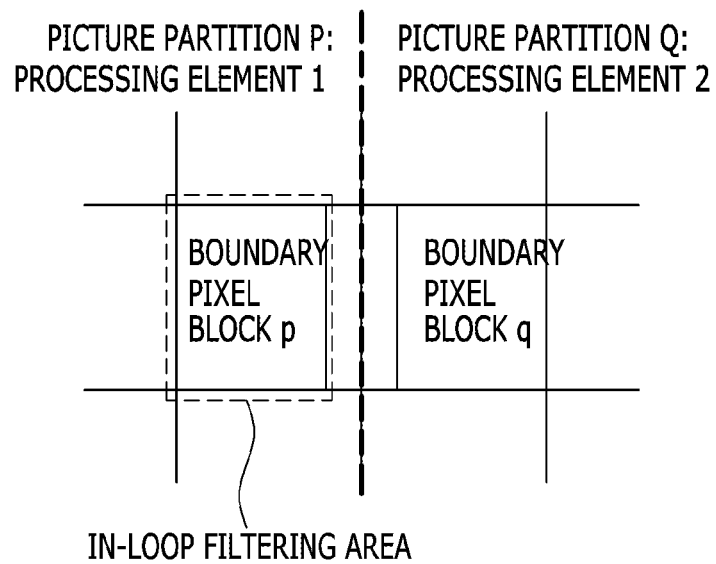

FIG. 6 is a view showing an example of a filter-sharing block within two neighboring pixel blocks processed by different processing elements. FIGS. 7 and 8 are views showing an example of an in-loop filtering area selected by the boundary pixel block status checker 470 of FIG. 4.

Referring to FIG. 6, it is assumed that the task distributor 110 allocates picture partition P and picture partition Q to different processing elements 1 and 2. Pixel block p within picture partition P is adjacent to pixel block q within picture partition Q, with a picture partition boundary between them. A filter-sharing block between the boundary pixel block p and boundary pixel block q includes some pixels of boundary pixel block p and some pixels of boundary pixel block q near the picture partition boundary.

A filter-sharing block, which is a set of pixels existing between two or more neighboring boundary pixel blocks, may be defined as pixels having data dependency on pixels in other picture partitions when in-loop filtering of post-loop filtering is applied.

The portion other than the filter-sharing block portion of boundary pixel block p is referred to as the inner portion of boundary pixel block p, and the portion other than the filter-sharing block portion of boundary pixel block q is referred to as the inner portion of boundary pixel block q.

Referring to FIG. 7 and FIG. 8, in processing element 1, the boundary pixel block status checker 470 checks if pixel block p is a boundary pixel block neighboring a picture partition boundary, and updates the status index of boundary pixel block p from "00" to "01" if pixel block p is a boundary pixel block. Next, the boundary pixel block status checker 470 checks the status index of boundary pixel block q neighboring the boundary pixel block p, with the picture partition boundary between them, and selects an in-loop filtering area for boundary pixel block p based on the status index of boundary pixel block q. Lastly, the boundary pixel block status checker 470 updates the status index of pixel block p from "01" to "10".

As illustrated in FIG. 7, in processing element 1, if the status of boundary pixel block q indicates "filtered", the boundary pixel block status checker 470 may select the inner portion of boundary pixel block p and the filter-sharing block of boundary pixel blocks p and 1 as an in-loop filtering area. The boundary pixel block status checker 470 updates the status index of boundary pixel block p from "01" to "10". In this case, the inner portion of boundary pixel block q becomes the in-loop filtering area for boundary pixel block q in processing element 2.

In processing element 1, the in-loop filter 480 performs in-loop filtering on the selected in-loop filtering area. In order to perform in-loop filtering on the filer-sharing block, the in-loop filter 480 may use pixel data and filter-related parameters for the filter-sharing block portion of boundary pixel block q that are stored in the filter data buffer 130.

When the in-loop filtering area has been in-loop filtered, the boundary pixel block status update unit 490 updates the status index of boundary pixel block p from "10" to "11".

As illustrated in FIG. 8, in processing element 1, if the status of boundary pixel block q indicates "unfiltered", the boundary pixel block status checker 470 may select only the inner portion of boundary pixel block p as an in-loop filtering area. The boundary pixel block status checker 470 updates the status index of boundary pixel block p from "01" to "10". In this case, the inner portion of boundary pixel block q and the filter-sharing block of boundary pixel blocks p and q become the in-loop filtering area for boundary pixel block q in processing element 2.

In processing element 1, the in-loop filter 480 performs in-loop filtering on the selected in-loop filtering area. In order to perform in-loop filtering on the filer-sharing block in processing element 2, the in-loop filter 480 for processing element 1 stores pixel data and filter-related parameters for the filter-sharing block portion within restored boundary pixel block p in the filter data buffer 130. When the in-loop filtering area has been in-loop filtered, the boundary pixel block status update unit 490 updates the status index of boundary pixel block p from "10" to "11".

In this way, picture partitions can be processed in parallel without additional processing elements for in-loop filtering of pixel blocks adjacent to picture partition boundaries, thereby minimizing degradations in processing speed.

Figure 9:
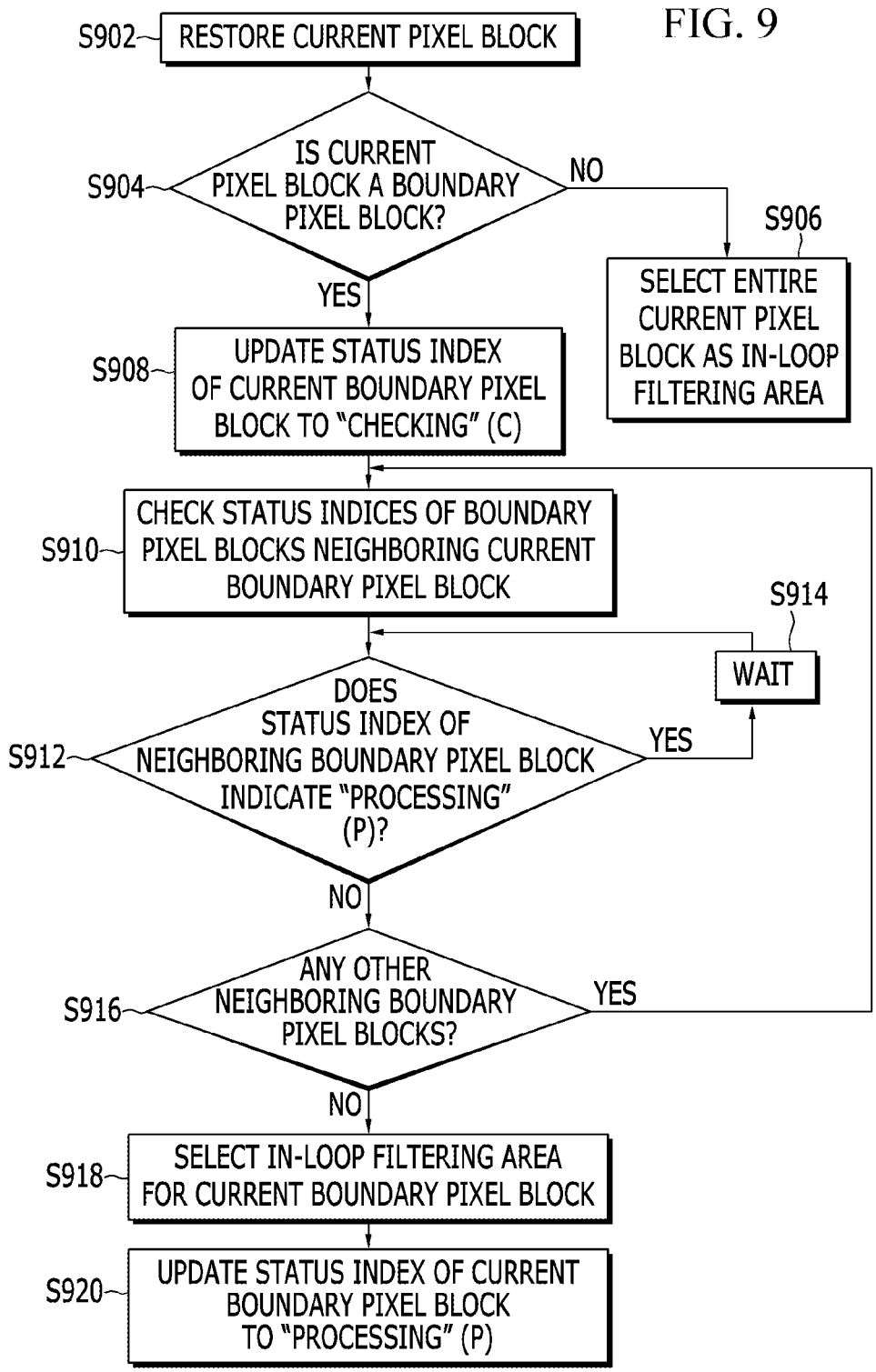
FIG. 9 is a flowchart showing in-loop filtering for pixel blocks according to an exemplary embodiment of the present invention.

FIG. 9 is a flowchart showing an in-loop filtering for pixel blocks according to an exemplary embodiment of the present invention.

Referring to FIG. 9, once the current pixel block is restored by the adder 460, the boundary pixel block status checker 470 checks if the restored current pixel block is a boundary pixel block (S904).

If the current pixel block is not a boundary pixel block, the boundary pixel block status checker 470 selects the entire current pixel block as an in-loop filtering area (S906). The in-loop filter 470 performs in-loop filtering on all the pixels in the current pixel block that can be in-loop filtered.

On the other hand, if the current pixel block is a boundary pixel block, the boundary pixel block status checker 470 updates the status index of the current boundary pixel block to "checking" (C) (S908).

As for the status index values shown in Table 1, the boundary pixel block status checker 470 may update the status index of the current boundary pixel block from "00" to "01".

The boundary pixel block status checker 470 checks the status indices of neighboring boundary pixel blocks existing in picture partitions other than the one the current boundary pixel block belongs to (S910). At least one boundary pixel block neighboring the current boundary pixel block may be positioned left, right, above, or below the current boundary pixel block. The boundary pixel block status checker 470 may check the status indices of all neighboring boundary pixel blocks.

If the status index of at least one neighboring boundary pixel block indicates "processing (P)" (S912), the boundary pixel block status checker 470 waits until the status index of the corresponding neighboring boundary pixel does not indicate "processing" (S914).

If the status index of a neighboring boundary pixel block does not indicate "processing" (P), the boundary pixel block status checker 470 checks if there are any other neighboring boundary pixel blocks (S916), and checks if the status indices of other neighboring pixel blocks indicate "processing" (P).

If the status indices of all neighboring boundary pixel blocks do not indicate "processing" (P), the boundary pixel block status checker 470 selects an in-loop filtering area for the current boundary pixel block based on the status indices of all neighboring boundary pixel blocks (S918).

Next, the boundary pixel block status checker 470 updates the status index of the current boundary pixel block to "processing" (P) (S920).

As for the status index values shown in Table 1, the boundary pixel block status checker 470 may update the status index of the current boundary pixel block from "01" to "10".

Figure 10:
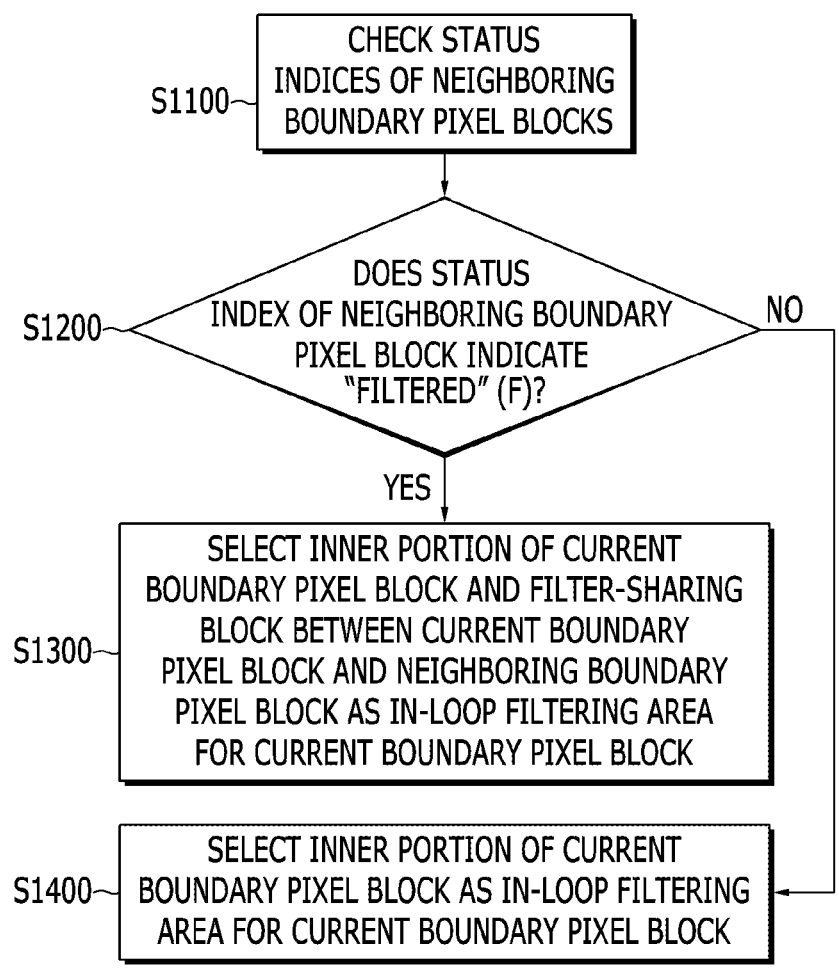
FIG. 10 is a flowchart showing a method for selecting the in-loop filtering area of FIG. 9 in detail.

FIG. 10 is a flowchart showing a method for selecting the in-loop filtering area of FIG. 9 in detail.

Referring to FIG. 10, the boundary pixel block status checker 470 checks the status indices of all neighboring boundary pixel blocks (S1100).

The boundary pixel block status checker 470 checks if the status index of a neighboring boundary pixel block indicates "filtered" (F) based on the status indices of all neighboring boundary pixel blocks (S1200).

The boundary pixel block status checker 470 selects the inner portion of the current boundary pixel block and a filter-sharing block between the current boundary pixel block and a neighboring boundary pixel block corresponding to "filtered" (F) as the in-loop filtering area for the current boundary pixel block (S1300).

For example, when there are filter-sharing blocks on the left or below the current boundary pixel block, if the status index of the neighboring boundary pixel block on the left side of the current boundary pixel block indicates "filtered" and the status index of the neighboring boundary pixel block below the current boundary pixel block indicates "unfiltered", the inner portion of the current boundary pixel block and the filter-sharing block on the left side of the current boundary pixel block is determined as the in-loop filtering area.

If the status indices of all neighboring boundary pixel blocks indicate "filtered", the inner portion of the current boundary pixel block and the filter-sharing blocks between the current boundary pixel block and all neighboring boundary pixel locks may be selected as the in-loop filtering area for the current boundary pixel block. That is, if the status indices of all neighboring boundary pixel blocks indicate "filtered" (F), the boundary pixel block status checker 470 may select the entire current pixel block and all filter-sharing blocks partially included in the current boundary pixel as the in-loop filtering area for the current boundary pixel block.

If the status indices of all neighboring boundary pixel blocks indicate "unfiltered", the boundary pixel block status checker 470 selects only the inner portion of the current boundary pixel block but not the filter-sharing blocks as the in-loop filtering area for the current boundary pixel block (S1400).

Once the in-loop filtering area is selected, the in-loop filter 480 performs in-loop filtering on the in-loop filtering area for the current boundary pixel block. Hereupon, the in-loop filter 480 stores pixel data in the area other than the in-loop filtering area for the current boundary pixel block and filter-related parameters in the filter data buffer 130.

Figure 11:
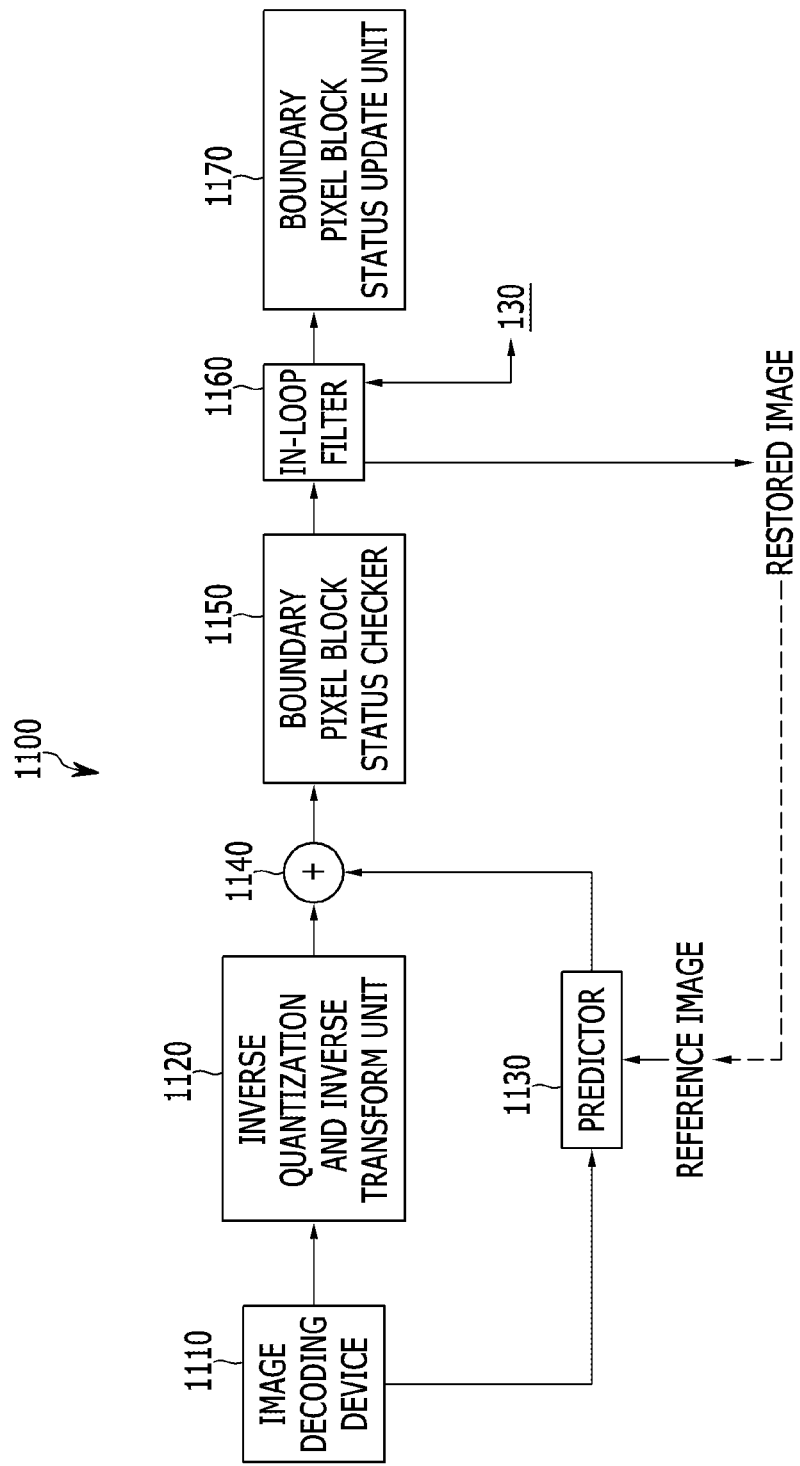
FIG. 11 is a view showing an example of an image decoding device according to an exemplary embodiment of the present invention.

FIG. 11 is a view showing an example of an image decoding device according to an exemplary embodiment of the present invention.

Referring to FIG. 11, an image decoding device 1100 includes a decoder 1110, an inverse quantization and inverse transform unit 1120, a predictor 1130, an adder 1140, a boundary pixel block status checker 1150, an in-loop filter 1160, and a boundary pixel block status update unit 1170. Program instructions for implementing the functions of the decoder 1110, inverse quantization and inverse transform unit 1120, predictor 1130, adder 1140, boundary pixel block status checker 1150, in-loop filter 1160, and boundary pixel block status update unit 1170 may be loaded to the memory 140.

The decoder 1110 decodes a bitstream encoded by the image encoding device 400, and extracts quantized frequency coefficients for the current pixel block.

The inverse quantization and inverse transform unit 1120 inversely quantizes the quantized frequency coefficients extracted by the decoder 1110, and inversely transforms the inversely quantized frequency coefficients to generate a residual block.

The predictor 1130 predicts the current pixel block to decompress with reference to a reference image, and outputs the prediction block to the adder 1140.

The adder 1140 adds the prediction block predicted by the predictor 1130 to the residual block generated by the inverse quantization and inverse transform unit 1120 to restore the current pixel block.

The boundary pixel block status checker 1150 performs the same function as the above-explained boundary pixel block status checker 470.

The in-loop filter 1160 performs in-loop filtering on an in-loop filtering area selected by the boundary pixel block status checker 1150. The current pixel block in-loop filtered by the in-loop filter 1160 may be input into the predictor 1130 and used as a reference image for predicting the next pixel block.

Filters used for video processing include an in-loop filter and a post-loop filter. Although FIG. 4 and FIG. 11 illustrate the in-loop filters 480 and 1160 as the filters used for video processing, post-loop filters or other filters for video processing may be used.

The boundary pixel bock status update unit 1170 performs the same function as the above-explained boundary pixel block status update unit 490. That is, if the current pixel block that has been in-loop filtered is a boundary pixel block, the boundary pixel block status update unit 1170 updates the status of the boundary pixel block.

By selecting an in-loop filtering area in the same way as the image encoding device 400, the image decoding device 1100 allows picture partitions to be processed in parallel without additional processing elements for in-loop filtering of pixel blocks adjacent to picture partition boundaries, thereby minimizing degradations in processing speed.

According to an embodiment of the present invention, it is possible to minimize degradations in processing speed without additional processing elements for filtering of pixel blocks adjacent to picture partition boundaries when dividing an image frame for high-speed processing the image frame and allocating different picture partitions to different processing elements to process them independently. Accordingly, the method and apparatus of the invention can be useful for dividing a high-resolution image and processing it in parallel.

The above-described exemplary embodiment can be realized through a program for realizing functions corresponding to the configuration of the embodiments or a recording medium for recording the program in addition to through the above-described apparatus and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of a plurality of processing elements to filter a plurality of pixel blocks including first and second boundary pixel blocks, the method comprising:
   checking a status of the second boundary pixel block adjacent to a picture partition boundary, the second boundary pixel block neighboring the first boundary pixel block in a first picture partition, the second boundary pixel block being in a second picture partition, the first boundary pixel block being adjacent to the picture partition boundary;
   selecting a filtering area for the first boundary pixel block based on the status of the second boundary pixel block; and
   filtering the filtering area for the first boundary pixel block,
   wherein selecting the filtering area for the first boundary pixel block comprises:
      selecting an inner portion of the first boundary pixel block and a filter-sharing block as the filtering area for the first boundary pixel block when the status of the second boundary pixel block is a filtered status, the filter-sharing block being disposed between the inner portion of the first boundary pixel block and an inner portion of the second boundary pixel block; and
      selecting only the inner portion of the first boundary pixel block as the filtering area for the first boundary pixel block when the status of the second boundary pixel block is an unfiltered status.

2. The method of claim 1, further comprising updating a status of the first boundary pixel block to a filtered status after the filtering of the filtering area for the first boundary pixel block is completed.

3. The method of claim 1,
   wherein the filter-sharing block comprises a first plurality of pixels of the first boundary pixel block and a second plurality of pixels of the second boundary pixel block, the first and second pluralities of pixels having data dependency on each other when in-loop filtering or post-loop filtering is performed.

4. The method of claim 3, wherein the filtering comprises:
   performing the in-loop filtering or the post-loop filtering on the inner portion of the first boundary pixel block; and
   storing pixel data in an area other than the filtering area for the first boundary pixel block in a buffer.

5. The method of claim 4, further comprising:
   selecting the inner portion of the second boundary pixel block and the filter-sharing block as a filtering area for the second boundary pixel block when only the inner portion of the first boundary pixel block is selected as the filtering area for the first boundary pixel block; and
   using the pixel data in the area other than the filtering area for the first boundary pixel block to filter the filtering area for the second boundary pixel block.

6. The method of claim 1,
wherein the filter-sharing block comprises some pixels of the first and second boundary pixel blocks adjacent to the picture partition boundary.

7. The method of claim 6, further comprising:
selecting only the inner portion of the second boundary pixel block as a filtering area for the second boundary pixel block, when the inner portion of the first boundary pixel block and the filter-sharing block are selected as the filtering area for the first boundary pixel block.

8. The method of claim 1, wherein the checking comprises updating a status of the first boundary pixel block to a check status which indicates that the second boundary pixel block is being checked.

9. The method of claim 1, wherein the checking comprises checking the status of the second boundary pixel block using a buffer that stores status indices of all boundary pixel blocks, each of the status indices comprising a bit string.

10. The method of claim 1, further comprising:
predicting a current pixel block to generate a prediction block;
subtracting the prediction block from the current pixel block to generate a residual block;
transforming and quantizing the residual block to generate quantized frequency coefficients for the residual block;
encoding the quantized frequency coefficients for the quantized residual block to generate a bitstream;
inversely quantizing the quantized residual block and inversely transforming the inversely quantized residual block; and
adding the prediction block to the inversely transformed residual block to restore the current pixel block,
wherein the first boundary pixel block is the restored current pixel block adjacent to the picture partition boundary.

11. The method of claim 1, further comprising:
decoding a compressed bitstream to extract quantized frequency coefficients for a current pixel block;
inversely quantizing the quantized frequency coefficients and inversely transforming the inversely quantized frequency coefficients to generate a residual block;
predicting the current pixel block to output a prediction block; and
adding the prediction block to the residual block to restore the current pixel block,
wherein the first boundary pixel block is the restored current pixel block adjacent to the picture partition boundary.

12. An apparatus for a plurality of processing elements to filter a plurality of pixel blocks including first and second boundary pixel blocks, the apparatus comprising:
a boundary pixel block status checker that checks a status of the second boundary pixel block adjacent to a picture partition boundary, the second boundary pixel block neighboring the first boundary pixel block in a first picture partition, the second boundary pixel block being in a second picture partition, the first boundary pixel block being adjacent to the picture partition boundary, the boundary pixel block status checker selecting a filtering area for the first boundary pixel block based on the status of the second boundary pixel block; and
a filter that filters the filtering area for the first boundary pixel block,
wherein the boundary pixel block status checker selects an inner portion of the first boundary pixel block and a filter-sharing block as the filtering area for the first boundary pixel block when the status of the second boundary pixel block is a filtered status, the filter-sharing block being disposed between the inner portion of the first boundary pixel block and an inner portion of the second boundary pixel block, and
wherein the boundary pixel block status checker selects only the inner portion of the first boundary pixel block as the filtering area for the first boundary pixel block; when the status of the second boundary pixel block is an unfiltered status.

13. The apparatus of claim 12, further comprising a boundary pixel block status update unit that updates, using a processor, a status of the first boundary pixel block to a filtered status after the filtering on the filtering area is completed.

14. The apparatus of claim 12, wherein the boundary pixel block status checker selects an entire portion of a non-boundary pixel block as a filtering area for the non-boundary pixel block, the non-boundary pixel block being in the first picture partition and not being adjacent to the picture partition boundary.

15. The apparatus of claim 12,
wherein the filter-sharing block comprises some pixels of the first and second boundary pixel blocks adjacent to the picture partition boundary.

16. The apparatus of claim 15, wherein:
the filter stores pixel data in an area other than the filtering area for the first boundary pixel block in a buffer;
the boundary pixel block status checker selects the inner portion of the second boundary pixel block and the filter-sharing block as a filtering area for the second boundary pixel block when only the inner portion of the first boundary pixel block is selected as the filtering area for the first boundary pixel block; and
the boundary pixel block status checker uses the pixel data in the area other than the filtering area for the first boundary pixel block to filter the filtering area for the second boundary pixel block.

17. The apparatus of claim 12, wherein the boundary pixel block status checker selects only the inner portion of the second boundary pixel block as a filtering area for the second boundary pixel block when the inner portion of the first boundary pixel block and the filter-sharing block are selected as the filtering area for the first boundary pixel block.

18. The apparatus of claim 12, wherein the boundary pixel block status checker updates a status of the first boundary pixel block to a processing status after the filtering area is selected.

19. The apparatus of claim 12, wherein, if the status of the second boundary pixel block is a processing status, the boundary pixel block status checker waits until filtering on the second boundary pixel block is completed.

20. The apparatus of claim 12, wherein the filter-sharing block comprises a first plurality of pixels of the first boundary pixel block and a second plurality of pixels of the second boundary pixel block, the first and second pluralities of pixels having data dependency on each other when in-loop filtering or post-loop filtering is performed.

* * * * *